Jan. 12, 1926.

M. KOECK, JR
GRASS TWINE MACHINE
Filed March 16, 1923

1,569,758

3 Sheets-Sheet 1

Jan. 12, 1926.

M. KOECK, JR
GRASS TWINE MACHINE
Filed March 16, 1923

1,569,758

3 Sheets-Sheet 2

INVENTOR:
Martin Koeck, Jr.
BY
Bottum, Hudnall, Lesher & McNamara
ATTORNEYS.

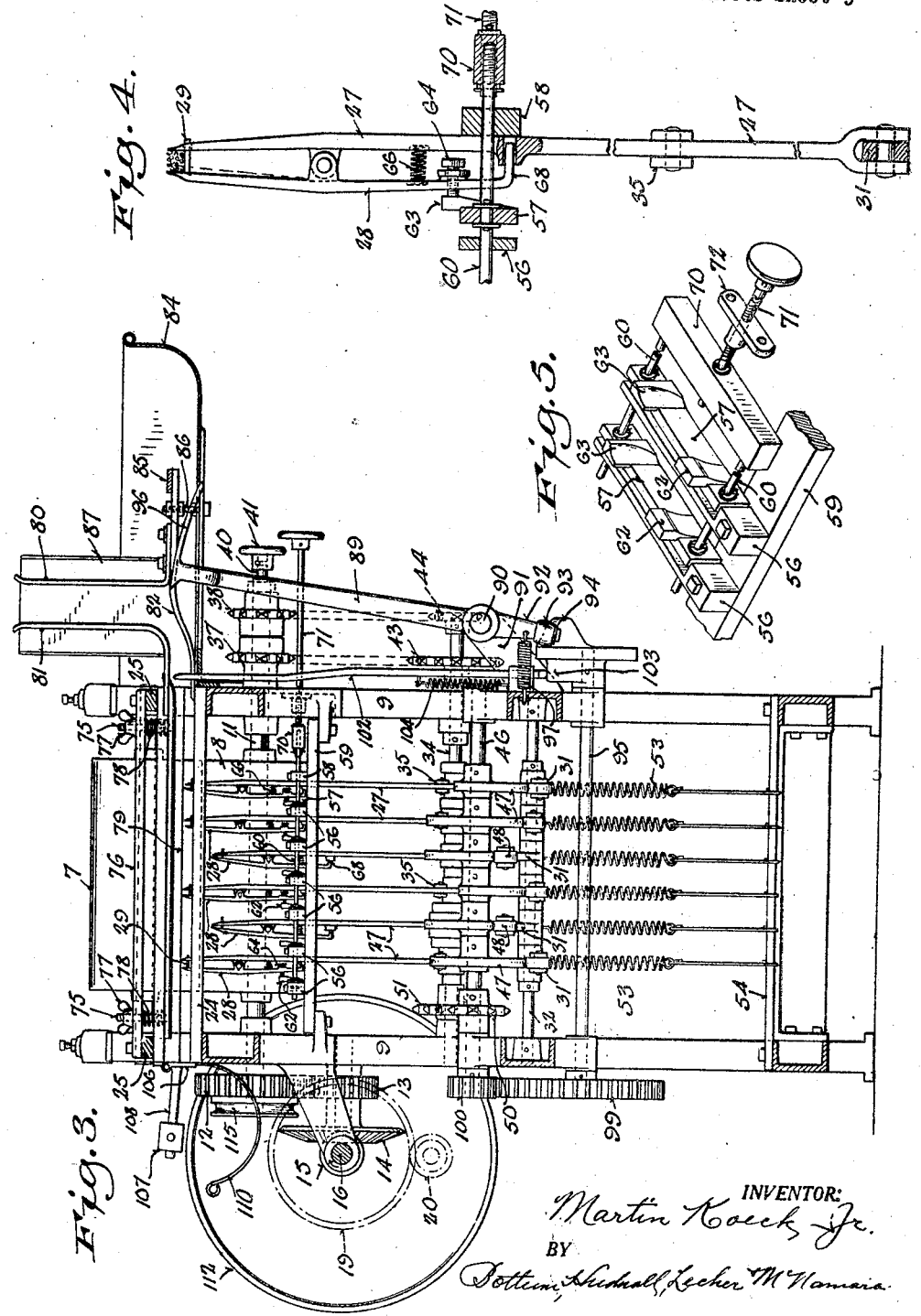

Patented Jan. 12, 1926.

1,569,758

UNITED STATES PATENT OFFICE.

MARTIN KOECK, JR., OF FOND DU LAC, WISCONSIN, ASSIGNOR TO DELTOX RUG COMPANY, OF OSHKOSH, WISCONSIN, A CORPORATION OF WISCONSIN.

GRASS-TWINE MACHINE.

Application filed March 16, 1923. Serial No. 625,499.

*To all whom it may concern:*

Be it known that I, MARTIN KOECK, Jr., a citizen of the United States, residing at Fond du Lac, in the county of Fond du Lac and State of Wisconsin, have invented certain new and useful Improvements in Grass-Twine Machines, of which the following is a specification, reference being had to the accompanying drawing, forming a part thereof.

This invention relates to machines for making so called grass twine for rugs, carpets and the like, by continuously winding or wrapping a number of stalks, stems or strands of grass or other material together with cord or thread.

Its main objects are to produce such twine of substantially uniform size, color or shade and appearance from grass or the like of varying length, size and color or shade; to provide for and facilitate the adjustment of the machine for operation on grass or the like of varying length, size and color or shade; and generally to improve the construction and operation of machines of this class.

It consists in the construction, arrangement and combination of parts as hereinafter particularly described and pointed out in the claims.

In the accompanying drawing like characters designate the same parts in the several figures.

Figure 1:
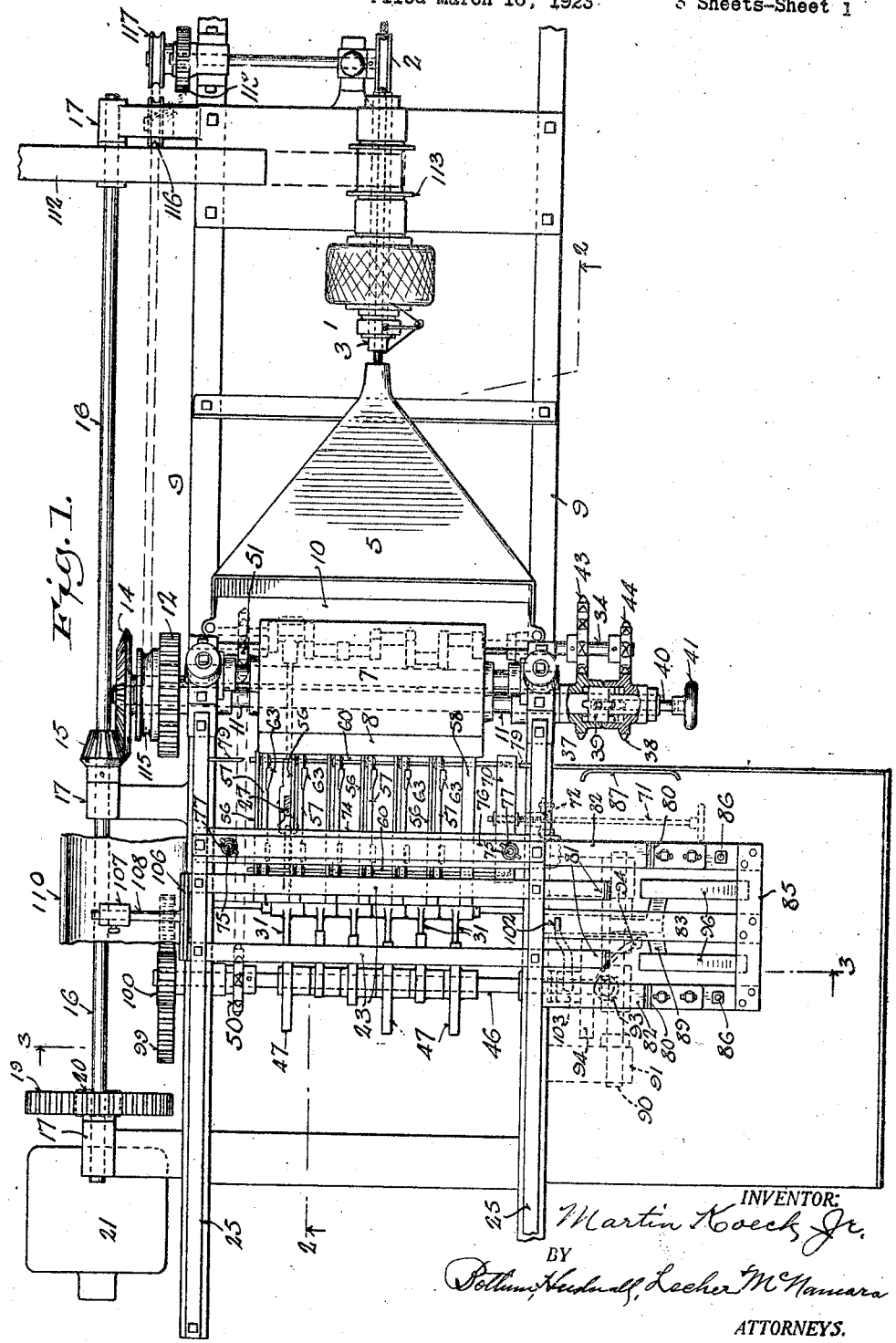
Figure 2:
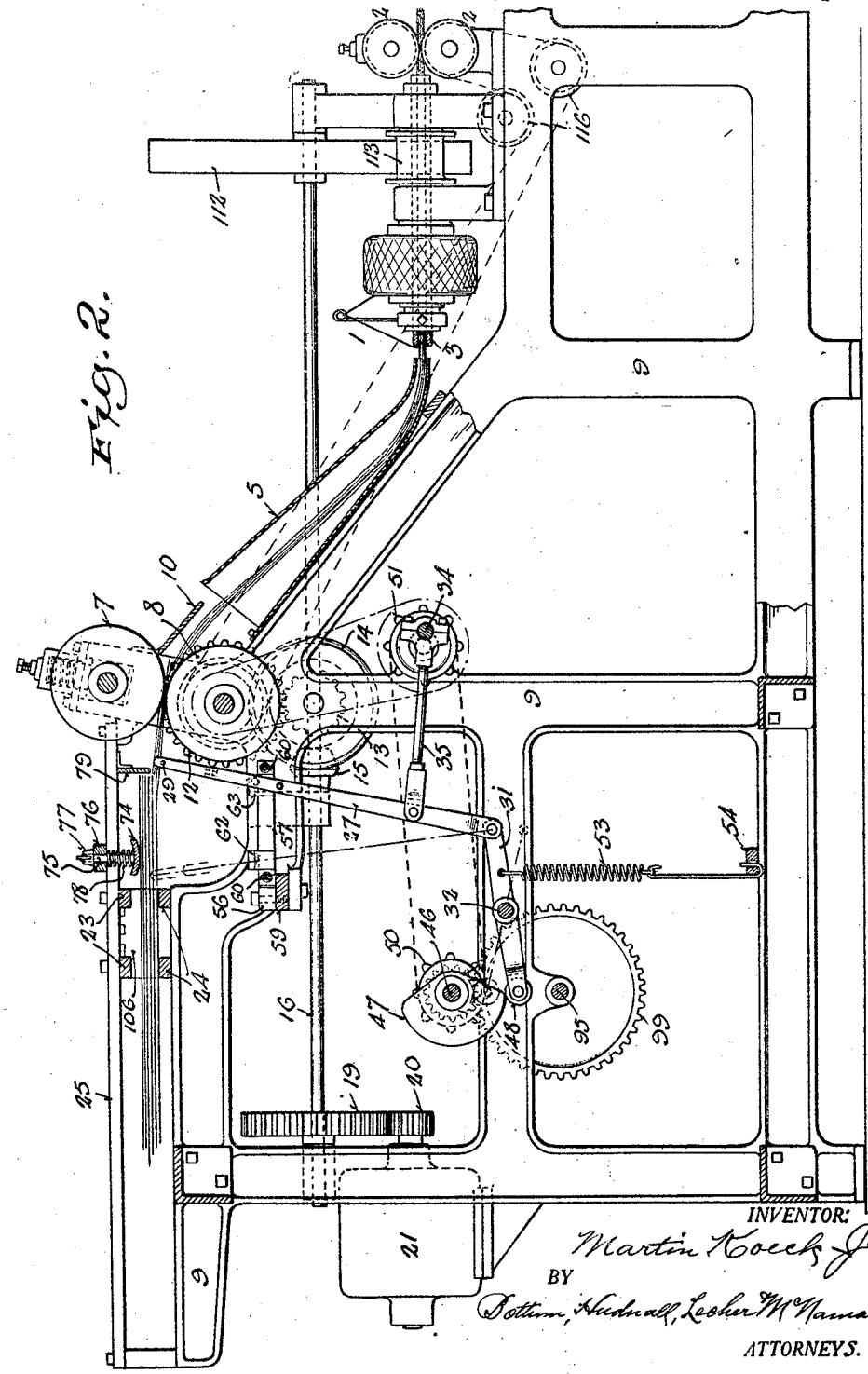

Figure 1 is a plan view of a machine embodying the invention; Fig. 2 is a front elevation and partial vertical longitudinal section of the machine on the line 2—2, Fig. 1; Fig. 3 is a vertical cross section of the machine on the line 3—3, Fig. 1; Fig. 4 is an enlarged detail view of one of the nippers and associated parts; and Fig. 5 is a perspective view of some of the nipper guides and adjustable cams for opening the nippers.

The machine comprises a winder 1, which may be of the usual or any suitable construction for continuously wrapping a cord or thread around a bunch of grass as it is fed to and through the winder, and a pair of rolls 2, for drawing the wrapped twine at a predetermined speed through the tubular shaft 3 of the winder.

A downwardly inclined funnel 5 has its lower end contracted and curved upwardly into axial alignment with the tubular shaft 3 of the winder.

A pair of feed rolls 7 and 8, are mounted on the frame 9 in position to deliver grass into the upper end of the funnel. A guide plate or deflector 10, extending transversely across the machine and fastened at the ends to the side members of the frame 9, is adapted to direct the grass as it is delivered from the feed rolls 7 and 8 downwardly into the upper laterally extended end of the funnel 5, as shown in Fig. 2.

The upper roll 7 is mounted in upwardly yielding bearings pressed by adjustable springs, as indicated in Fig. 2, towards the bearings of the lower roll 8.

The shaft 11 of the lower roll 8 is extended at the ends beyond the sides of the frame, and at the rear end is provided with a gear 12, meshing as shown in Fig. 3, with a gear 13, connected coaxially and rotated with a bevel gear 14. The bevel gear 14 meshes with a bevel pinion 15 on a longitudinal shaft 16, mounted in bracket bearings 17 on the rear side of the frame 9. The shaft 16, which is the main driving shaft of the machine, may be connected in any suitable manner with any convenient source of power. As shown, it is connected by a gear 19, and a pinion 20, with the shaft of a motor 21, mounted as shown in Figs. 1 and 2, on the rear side of the frame 9.

A grass conduit extends across the upper part of the machine parallel with the feed rolls 7 and 8 on the opposite side thereof from the funnel 5. This conduit preferably consists of upper and lower parallel bars 23 and 24. The lower bars 24 are supported at the ends on the side members of the frame 9 to which they are fastened, and the upper bars 23 are fastened at the ends to and supported by longitudinal bars 25, which are fastened at their ends to and supported by parts of the frame above and parallel with its side members, leaving a clear space on both sides of the bars 23 and 24 for grass of different lengths, as shown in Fig. 2.

The machine is provided with a series of nippers, six being shown in the present case, for transferring stalks of grass or the like lengthwise from the transverse conduit formed by the bars 23 and 24 into the bite of the feed rolls 7 and 8. These nippers each consist in the present case, as shown in detail in Fig. 4, of an upright arm 27 and a shorter arm or lever 28, pivoted to one side of the arm 27 adjacent its upper end, the upper ends of the two arms forming jaws to receive and grasp between them more or less grass or the like. One of the nipper jaws is provided with a cross pin 29, projecting therefrom through and guided in an opening in the other jaw to limit the depth or quantity of grass that can be received at one time between the open jaws. The arms 27 are pivoted at their lower ends to horizontally and longitudinally disposed levers 31, which are pivotally supported or fulcrumed between their ends on a cross shaft 32, parallel with the shafts of the rolls 7 and 8, and fastened or supported at its ends in the side members of the frame 9. A cross shaft 34, supported in bearings on the sides of the frame 9 below and parallel with the roll shaft 11, is provided with cranks or eccentrics set at different angles. Each nipper arm 27 is connected adjacent its lower end by a rod 35, with a crank or eccentric of the shaft 34.

The crank shaft 34 is driven at a variable speed from the roll shaft 11 as follows:

The extended front end of the roll shaft 11 is provided with two sprocket wheels 37 and 38, which are loosely mounted thereon next to each other and recessed on their adjoining sides to receive and house a clutch member 39, slidably mounted on the shaft and adapted to be shifted into engagement with either of the sprocket wheels, which are formed or provided with corresponding clutch members. The clutch member 39 is connected, as shown in Fig. 1, by a cross pin passing through a slot in the shaft 11, with a shifting rod 40, which projects through an axial bore in the shaft, and is provided at its front end with a handle 41, preferably swiveled thereon, to facilitate manipulation of the clutch and to prevent injury to attendants.

The sprocket wheels 37 and 38 are connected respectively with sprocket wheels 43 and 44, fixed on the extended front end of the crank shaft 34 by link belts, as indicated by dotted lines in Figs. 2 and 3. The sprocket wheels 43 and 44 are of different diameters for rotating the crank shaft 34 at different speeds, according to the adjustment of the clutch member 39, the driving sprocket wheel 37 when engaged by the clutch member, operating through the larger sprocket wheel 43 with which it is connected, to turn the crank shaft at a slower speed than it is turned through the smaller sprocket wheel 44 by the driving sprocket wheel 38 when it is engaged by the clutch member. The arrangement of the sprocket wheels and clutch may be varied without affecting their operation, as for example, the sprocket wheels 37 and 38 may be mounted on the shaft 34 and the sprocket wheels 43 and 44 on the shaft 11, and the shiftable clutch member 39 may be mounted on either shaft to cooperate with whichever pair of sprocket wheels may be mounted thereon.

A shaft 46, supported in bearings on the side members of the frame 9 above and parallel with the shaft 32, is provided with cams 47, arranged to cooperate with rollers or cam followers 48 with which the levers 31 are provided at the ends opposite the nipper arms 27, for lifting and lowering the nippers into and out of the path of the grass between the feed rolls 7 and 8 and the adjacent conduit bars 23 and 24 at the beginning and end of the advance movement of the nippers. The cam shaft 46 is rotated at the same rate of speed as the crank shaft 34, by a link belt connecting sprocket wheels 50 and 51, with which said shafts are provided. The cams 47 are set at different angles to one another, corresponding with the angular positions of the cranks on the shaft 34, so as to lift the nippers into and hold them in the path of the grass as they advance towards the feed rolls, and lower and hold them out of the path of the grass, as they return towards the conduit 23—24, one after another, and thereby evenly distribute and mingle the grass as it is carried from said conduit to the feed rolls, thus tending to produce twine of uniform size and color or shade.

The rollers 48 are held in contact with the cams 47 by springs 53 connecting the levers 31 with a cross piece 54 of the frame.

Adjacent the lower ends of their shorter arms 28, the nippers pass between parallel longitudinal guides 56, 57 and 58. The guides 56 and 58 are fastened at one end to and supported by a cross bar 59, with their inner or rear faces next to the outer or front faces of the nipper arms 27. The guides 57 are carried next to the inner or rear faces of the nipper arms 28 on parallel cross rods 60, on which they are fastened in proper spaced relation, and which are slidably mounted and supported in the guides 56 and 58. The guides 57 are provided adjacent their ends with cams or inclines 62 and 63, for opening the nippers at the beginning and end of their advance movement, by engagement with adjustable contact screws 64 with which the arms 28 are provided adjacent their lower ends.

As shown in Fig. 4, springs 66, interposed between the arms 27 and 28 below their pivot connections, tend to close the jaws of the nippers. The arms 28 have transverse bends or extensions 68 at their lower ends, which are guided in openings in the arms 27.

The rods 60 are connected at their front ends by a bar or cross head 70, which is in turn connected by a screw 71 with the front side member of the frame, the screw being swiveled at its inner end in the bar or cross head and threaded in a nut 72 fastened to the frame, for simultaneously adjusting the cams or inclines 62 and 63 to open the nippers more or less, as desired, according to length, size and nature or condition of the grass or the like.

To guide and hold the grass in position to be effectively grasped by the nippers as they are pushed upwardly at the beginning of their advance movement into the path of the grass, a vertically adjustable and upwardly yielding transverse presser bar 74, having a rounded lower face, is suspended between and parallel with the feed rolls 7 and 8 and adjacent conduit bars 23 and 24, by threaded stems 75 from a cross bar 76, fastened at its ends to the bars 25. The stems 75 pass upwardly through and are guided in the bar 76, and are provided with nuts 77 for adjusting the presser bar 74 up or down. Helical springs 78, placed on the stems 75 between the presser bar 74 and the cross bar 76, permit the presser bar to yield upwardly as the nippers pass below it with more or less grass.

A barrier or stop board or plate 79, fastened to the frame 9 and extending across the machine with its lower edge just above the path of the advancing nipper jaws adjacent the feed rolls 7 and 8, prevents the grass grasped and advanced by the nippers from drawing the adjoining grass in the conduit 23—24, into the bite of the feed rolls.

For supplying the conduit formed by the bars 23 and 24 with the requisite quantity of grass, in proper position for the transfer thereof by the nippers to the feed rolls 7 and 8, a hopper, rack or receiver is provided at the front side of the machine. As shown, this hopper, rack or receiver, consists of bands 80 and 81 or the like, forming the front and rear sides, and bands 82 and 83 or the like, forming the bottom. The bands 81 are bent at their lower ends rearwardly and are fastened to the upper bars 23 of the grass conduit. The bands 80 are bent forwardly at their lower ends and adjustably fastened to the bottom bands 82. The bands 82 and 83 are bent downwardly towards their inner or rear ends and form with the lower rearwardly bent ends of the bands 81, an adjustable passage or opening from the lower part of the receiver into the front end of the conduit between the bars 23 and 24.

A tray or pan 84 is fastened to the front side of the machine below and around the receiver, for holding a conveniently accessible supply of grass to be placed by the operator in proper position in the receiver. The front ends of the bottom bands 82 and 83 of the receiver are connected by a band or bar 85, and the side bands 82 are adjustably connected with and supported from the bottom of the tray or pan 84, or brackets on which it is mounted, by bolts 86. By the adjustment of the bands 82 and 83 up or down, the passage or opening from the receiver into the conduit is contracted or enlarged.

To the side of the tray or pan 84 nearest the feed rolls, an upwardly extending plate 87 is fastened opposite the receiver in approximate alignment transversely to the machine with the barrier or stop board 79, for gaging and evening the butts of the grass or the like as it is placed in the receiver by the operator for proper delivery into the machine.

Grass is intermittently transferred from the lower part of the receiver transversely to the stalks or stems, by a reciprocatory feed member 89, consisting as shown, of an arm fixed at its lower end on a horizontal rocker shaft 90, which is journaled in and supported by brackets 91 on the front side of the frame parallel therewith.

A depending arm 92, fixed on the shaft 90, is provided with a roller or cam follower 93, arranged to cooperate with a cam 94 fixed on the front end of a transverse shaft 95, to rock the arm 89 back and forth, underneath the grass receiver, towards and from the transverse conduit with which it communicates. The upper end of the arm 89 is forked and formed or provided between the bands 82 and 83 with forwardly extending curved arms 96, concentric with the shaft 90 and forming a cut-off to close the opening at the lower end of the receiver into the transverse conduit and to support the grass in the receiver when the feed arm is advanced towards the conduit. A spring 97, connecting the arm 92 with the frame, holds the roller 93 in engagement with the cam 94.

The shaft 95 is provided at its rear end with a gear 99, which meshes with a pinion 100 on the rear end of the cam shaft 46, for rotating the cam 94.

To confine the grass in the conduit under the desired compression and to prevent its receding therefrom towards the receiver when the feed arm 89 is withdrawn forwardly by the spring 97, a stop movable into and out of the passage or opening from the receiver into the conduit is provided. As shown, particularly in Fig. 3, this stop consists of a vertically reciprocating rod 102, guided on the front side of the frame and movable at its upper end into and out of the conduit or the passage or opening connecting it with the receiver. At its lower end the rod 102 engages a cam 103, which may be formed as shown, with the cam 94 and fastened therewith on the shaft 95. A spring 104 holds the lower end of the stop rod 102 in contact with the cam 103, which is formed and set to thrust the rod upwardly into the grass conduit or passage and hold it therein when the upper end of the feed arm or member 89 is withdrawn, and to permit the spring 104 to draw the rod or stop downwardly out of the conduit or passage when the feed arm or member is advanced.

At the back end of the transverse grass conduit, an outwardly opening and yielding and adjustably weighted gate 106 is hinged at its upper side to the rear ends of the bars 23 or the upper side of the conduit, to confine the grass in the conduit under a certain degree of compression, determined by the adjustment of the weight 107 on a rearwardly projecting arm 108 of the gate. A trough 110 is attached to the rear side of the frame 9 below the gate 108, for receiving surplus grass discharged from the rear end of the conduit.

The main shaft 16 is provided with a pulley 112, which is connected by a belt with a smaller pulley 113 on the tubular winder shaft 3.

The shaft 11 of the lower feed roll 8, is provided at its rear end with a pulley 115, which is connected, as indicated by dotted lines in Figs. 1 and 2, by a belt passing around idle pulleys 116, with a pulley 117 on the rear end of the shaft of the lower roll 2. The shafts of the rolls 2 are connected at their rear ends by gears 118, and the front bearing of the upper roll shaft is made like the bearings of the shaft of the upper feed roll 7, to yield upwardly, so as to exert an adjustable yielding pressure on the wrapped twine passing between the rolls.

In the operation of the machine, the operator takes grass from a supply in the tray or pan 84 and places it between the front and rear bands 80 and 81 of the receiver, with the stalks or stems lengthwise of the machine and the butts against the gage and evener plate 87.

The machine being set in motion, as the upper end of the feed arm or member 89 is swung rearwardly by the cam 94, and the stop rod 102 is drawn downward by the spring 104 against the low part of the cam 103, a certain quantity of grass, depending upon various adjustments of the machine, is carried from the lower part of the receiver into the front end of the transverse conduit between the bars 23 and 24. As the upper end of the feed arm or member 89 is withdrawn from below the receiver, the stop rod 102 is projected upwardly by the cam 103 into the opening or passage from the receiver into the conduit, thereby preventing the grass delivered into it from receding with the feed arm as it is withdrawn.

The nippers at the end of their backward movement below the path of the grass from the conduit to the feed rolls 7 and 8, are thrust upward by the cams 47 one after another, from the position indicated by the lower dotted lines, to the position indicated by the upper dotted lines in Fig. 2. With their upward movement, the contact screws 64 engage the cams 62 and open the jaws, as shown in Fig. 4, to receive more or less grass according to the adjustment of the screws 64 and of the cams 62, the presser bar 74 crowding the grass between the open jaws against the cross pins 29.

With the initial advance movement of the nippers by their connections with the crank shaft 34, the contact screws 64 clear the cams 62, and being released, the lower ends of the pivoted arms 28 are pressed by the springs 66 away from the arms 27, thereby closing the jaws at the upper ends of the arms upon the grass between them, which is carried forward therewith into the bite of the feed rolls 7 and 8. At the end of the advance movement of the nippers effected by the cranks on the shaft 34, the screws 64 engaging the cams 63, open the nippers against the tension of the springs 66, releasing the grass between the jaws of the nippers, which is drawn therefrom and delivered by the rolls into the funnel 5. The grass in its passage through the funnel is bunched together and is directed at its lower end into the hollow shaft 3 of the winder, through which it passes to the rolls 2 with the wrapped stalks straight and parallel with one another, or without being twisted.

With the opening of the nipper jaws at the end of their advance movement, they are dropped by the cams 47 and shifted downward by the springs 53 below the path of the grass, in which position they are returned by the crank shaft 34 to the starting points below the presser bar 74, the screws clearing the cams 63 as the nippers descend below the path of the grass and the jaws being closed and held closed during their return movement by the springs 66. The nippers advancing one after another, with bunches of grass taken from different parts of the conduit, evenly distribute the grass delivered to the feed rolls 7 and 8, and thence through the funnel 5 to the winder, thereby avoiding variation in size and color or shade of the twine, due to variation in the length, size and color or shade of the grass as it is supplied to the machine.

Whenever the pressure on the grass accumulating in the conduit between the bars 23 and 24, exceeds a certain limit due to variations in the length, size and condition of the grass supplied to the machine, the gate 108 automatically opens and relieves such pressure, the surplus grass being discharged into the trough 110, from which it is transferred from time to time by the operator back to the tray or pan 84.

By the adjustment of the bottom bands or members 82 and 83 of the receiver to vary the size of the passage or opening from the lower part thereof into the transverse conduit, the adjustment of the weight 107 on the gate 106 to regulate the pressure on the grass in the conduit 23—24, the adjustment of the cams 62 and 63 for varying the opening of the nipper jaws to receive and grasp more or less grass, and the adjustment of the clutch member 39 to change the speed of the crank and cam shafts 34 and 46 and of the nippers, any or all of such adjustments being made, as may be necessary or desirable, twine may be produced of substantially uniform size and color or shade from grass or the like varying widely in length, size and color or shade, as well as in other respects.

By the term "grass" as herein used, it is intended to include any vegetable stalks or stems or fibers of other material suitable for the production of wound or wrapped twine of the class known as "grass twine".

Various changes in the construction and arrangement of parts of the machine may be made without departure from the spirit and scope of the invention as defined in the following claims.

I claim:

1. In a grass twine machine the combination of a conduit, feed rolls adjacent the conduit, levers, nippers pivoted to the levers and adapted to transfer grass lengthwise from the conduit to the rolls, cranks connected with the nippers and adapted to swing them back and forth between the conduit and feed rolls, and cams cooperating with the levers to shift the nippers into the path of the grass on their forward movement and out of the path of the grass on their backward movement.

2. In a grass twine machine the combination of a grass conduit, feed rolls adjacent the conduit, levers, nippers pivoted to the levers and adapted to grasp and transfer stalks of grass lengthwise from the conduit to the rolls, cranks connected with the nippers and set at different angles to advance the nippers successively, and cams cooperating with the levers to shift the nippers on their forward movement into the path of the grass and on their backward movement out of the path of the grass.

3. In a grass twine machine the combination of a grass conduit, feed rolls adjacent the conduit, nippers movable back and forth and up and down and having laterally opening and closing jaws adapted to grasp and transfer stalks of grass lengthwise from the conduit to the rolls, means for moving the nippers forward and back and up and down, into and out of the path of the grass, means tending to close the nipper jaws, and cams adapted to open the jaws as the nippers are moved upward and downward at the beginning and end of their forward movement.

4. In a grass twine machine the combination of a grass conduit, feed rolls adjacent the conduit, nippers provided with laterally opening and closing jaws movable forward and back and up and down into and out of the path of the grass from the conduit to the rolls, means for imparting the required movements to the nippers, means tending to close the nipper jaws, and cams adjustable towards and from the paths of the nippers and adapted to open the nipper jaws more or less at the beginning and end of their forward movement.

5. In a grass twine machine the combination of a grass conduit, feed rolls adjacent the conduit, nippers having laterally opening and closing jaws movable forward and back and up and down into and out of the path of the grass from the conduit to the rolls, means for imparting such forward and back and up and down movements to the nippers, means tending to close the nipper jaws, cams adapted to open the nipper jaws as they are moved upward and downward at the beginning and end of their advance movement, and means for simultaneously adjusting the cams towards and from the paths of the nippers.

6. In a grass twine machine the combination of a grass conduit, feed rolls adjacent one side of the conduit, means for transferring grass lengthwise from the conduit to the rolls, a grass receiver communicating at the bottom with one end of the conduit, a feed member movable through the bottom of the receiver towards and from the conduit, and a cam for moving the feed member to and fro.

7. In a grass twine machine the combination of a grass conduit, feed rolls adjacent one side of the conduit, a grass receiver communicating at the bottom with one end of the conduit, means for transferring stalks of grass lengthwise from the conduit to the rolls, a vibratory feed member movable through the bottom of the receiver towards and from the conduit, a stop movable into and out of the conduit adjacent the receiver, and means for operating the feed member and stop.

8. In a grass twine machine the combination of a grass conduit, feed rolls adjacent one side of the conduit, means for transferring stalks of grass lengthwise from the conduit to the rolls, a grass receiver communicating at the bottom with one end of the conduit, a feed member movable through the lower part of the receiver towards and from the conduit, an outwardly opening and yielding gate at the opposite end of the conduit, a stop movable into and out of the conduit adjacent the receiver, means for operating the feed member, and means for projecting the stop into the conduit when the feed member is withdrawn, and withdrawing it when the feed member is advanced.

9. In a grass twine machine the combination of a grass conduit extending across the machine, feed rolls adjacent one side of the conduit, means for transferring stalks of grass lengthwise from the conduit to the rolls, a grass receiver opening at the bottom into one end of the conduit, a feed member movable through the lower part of the receiver towards and from the conduit and provided with a cut-off for closing the opening from the receiver into the conduit when the feed member is advanced, a movable stop, and means for projecting the stop into the conduit adjacent the receiver when the feed member is withdrawn, and withdrawing it when the feed member is advanced.

10. In a grass twine machine the combination of a grass conduit extending across the machine, feed rolls adjacent the conduit, means for transferring stalks of grass lengthwise from the conduit to the rolls, a grass receiver opening at the bottom into the conduit, means for adjusting the opening from the receiver into the conduit, a feed member movable through the lower part of the receiver towards and from the conduit, and means for moving the feed member to and fro.

11. In a grass twine machine the combination of a grass conduit extending across the machine, feed rolls adjacent the conduit, nippers movable forward and back between the conduit and rolls and up and down at the beginning and end of their advance movement into and out of the path of grass from the conduit to the rolls, means tending to close the nippers, means adapted to open the nippers as they move up and down at the beginning and end of their advance movement, and an upwardly yielding presser bar extending across the path of the grass from the conduit to the rolls.

12. In a grass twine machine the combination of a grass conduit extending across the machine, feed rolls adjacent the conduit, reciprocating nippers movable forward and back between the conduit and rolls and up and down into and out of the path of the grass from the conduit to the rolls, means tending to close the nippers, means adapted to open the nippers as they move up and down at the beginning and end of their advance movement into the path of the grass from the conduit to the rolls, a vertically adjustable and upwardly yielding presser bar extending across the path of the grass from the conduit to the rolls above the paths of the nippers, means for feeding grass transversely into one end of the conduit, and an outwardly opening, adjustably yielding and normally closed gate at the other end of the conduit.

13. In a grass twine machine the combination of a grass conduit extending horizontally across the machine, transverse feed rolls adjacent the conduit, nippers for transferring grass lengthwise of the stalks from the conduit to the rolls, means for feeding grass transversely into one end of the conduit, an outwardly opening and yielding gate at the other end of the conduit, and a trough located below the gate to receive surplus grass discharged from the conduit.

14. In a grass twine machine the combination of a grass conduit extending across the machine, transverse feed rolls adjacent one side of the conduit, reciprocating nippers for transferring grass lengthwise of the stalks from the conduit to the rolls, a grass receiver communicating at the bottom with one end of the conduit, a feed member movable through the lower part of the receiver towards and from the conduit, means for operating the feed member, a stop movable into and out of the conduit adjacent the receiver, means for projecting the stop into the conduit when the feed member is withdrawn and withdrawing it when the feed member is advanced, and an outwardly opening and yielding gate at the other end of the conduit, and a trough located below the gate to receive surplus grass discharged from the conduit.

15. In a grass twine machine the combination of a grass conduit extending across the machine, feed rolls adjacent one side of the conduit, reciprocating nippers for transferring stalks of grass lengthwise thereof from the conduit to the rolls, levers with which the nippers are pivotally connected, a shaft having cranks connected with the nippers and adapted to swing them to and fro, a shaft provided with cams cooperating with the levers to shift the nippers up and down at the beginning and end of their forward movement into and out of the path of the grass from the conduit to the rolls, a transmission connection between the crank and cam shafts to rotate them at the same speed, sprocket wheels on one of the roll shafts, sprocket wheels on the crank shaft, link belts connecting the sprocket wheels on the roll shaft with the sprocket wheels on the crank shaft, the sprocket wheels on one of the shafts being of different sizes and the sprocket wheels on one of the shafts being loosely mounted thereon, and a clutch member shiftable into engagement with either of the loose sprocket wheels to operatively connect it with the shaft on which it is mounted for varying the speed of the crank and cam shafts and of the nippers.

16. In a grass twine machine the combination of a grass conduit, feed rolls adjacent the conduit, nippers provided with laterally opening and closing jaws movable forward and back and up and down into and out of the path of the grass from the conduit to the rolls, means for imparting the required movements to the nippers, means tending to close the nipper jaws, and means adapted to open the nipper jaws more or less at the beginning and end of their forward movement.

In witness whereof I hereto affix my signature.

MARTIN KOECK, Jr.